Jan. 14, 1964    A. M. DEDIC, SR    3,117,689
PROP FOR TRUNK COMPARTMENT LIDS
Filed Oct. 16, 1962
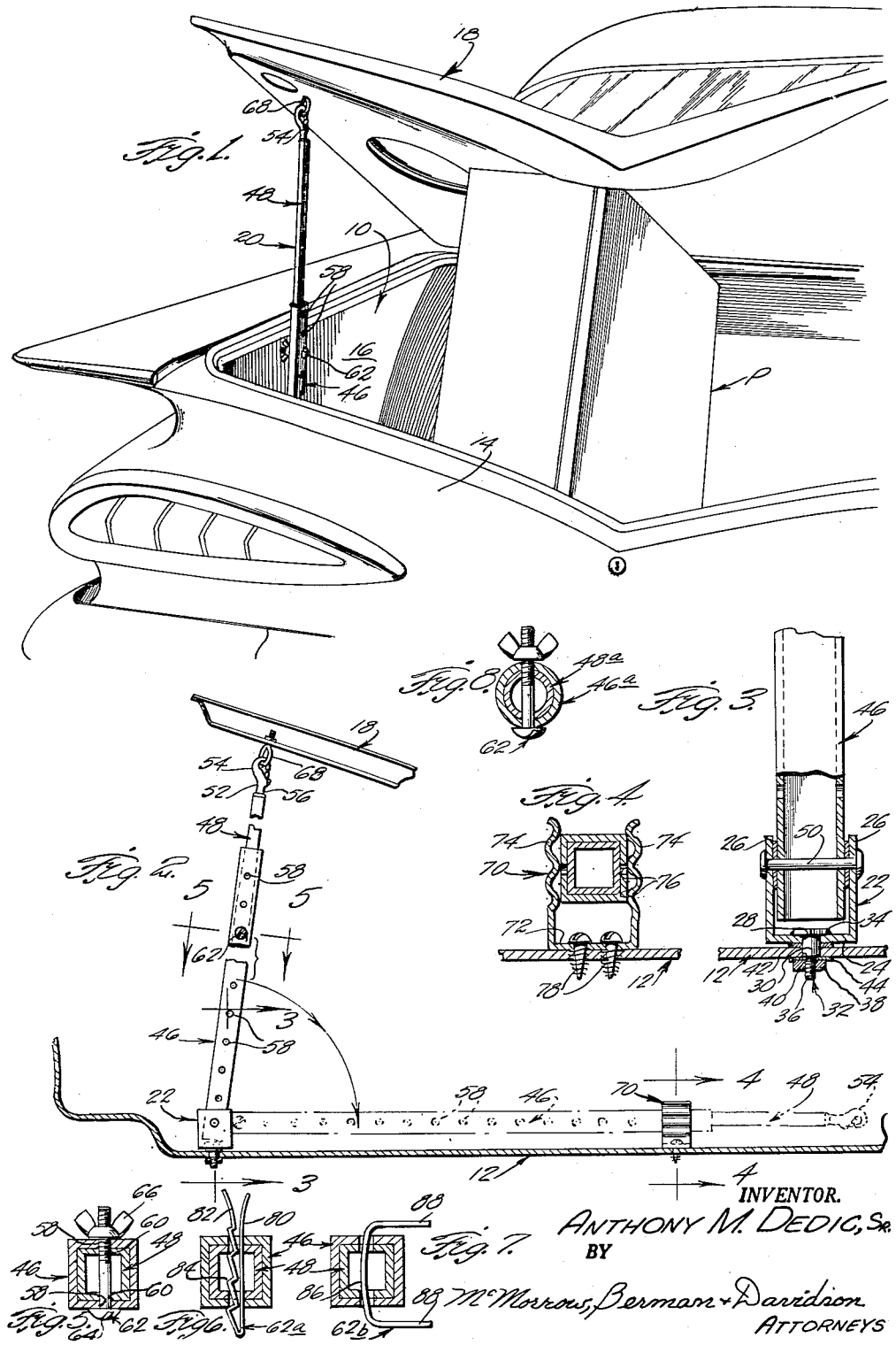
INVENTOR.
ANTHONY M. DEDIC, SR.
BY
McMorris, Berman + Davidson
ATTORNEYS

United States Patent Office 3,117,689
Patented Jan. 14, 1964

3,117,689
PROP FOR TRUNK COMPARTMENT LIDS
Anthony M. Dedic, Sr., 4142 Sweet Gum Drive,
St. Louis, Mo.
Filed Oct. 16, 1962, Ser. No. 230,899
4 Claims. (Cl. 217—60)

This invention relates to a novel prop for automobile trunk compartment lids and the like.

The primary object of the invention is the provision of an efficient, rugged, and readily adjusted device of the kind indicated, which is permanently mounted on the floor of the trunk compartment, and which, when not in use, is adapted to be folded down upon the floor, either along one side of the compartment or crosswise of the compartment, into an out-of-the-way position; and which includes means for securely and releasably connecting the prop to the underside of the lid, in an open position of the lid, so that the lid is prevented from bouncing and damaging itself and large packages present in the compartment which are taller than the compartment.

Another object of the invention is the provision of a simple device of the character indicated above, which is composed of a small number of uncomplex and easily assembled parts, is easily installed, and which can be mass-produced at relatively low cost, such that the device is adaptable for general installation by automobile manufacturers.

Other important objects and advantageous features of the invention will be apparent from the following description and the accompanying drawings, wherein, for purposes of illustration only, specific forms of the invention are set forth in detail.

In the drawings:

FIGURE 1 is a fragmentary schematic perspective view showing an automobile trunk compartment with its lid held in an elevated open position to accommodate a package taller than the compartment, by means of a prop of the present invention;

FIGURE 2 is a fragmentary and contracted vertical longitudinal section taken through FIGURE 1, showing the prop in a vertical operative position and connected to the lid, in full lines, and in a horizontal storage position on the compartment bottom wall, in phantom lines;

FIGURE 3 is an enlarged fragmentary vertical transverse section taken on the line 3—3 of FIGURE 2;

FIGURE 4 is an enlarged vertical transverse section taken on the line 4—4 of FIGURE 2;

FIGURE 5 is an enlarged horizontal section taken on the line 5—5 of FIGURE 2;

FIGURES 6 and 7 are views similar to FIGURE 5, but showing different forms of adjustment retaining means; and FIGURE 8 is a view similar to FIGURE 5, but showing cylindrical rather than rectangular cross sections.

Referring in detail to the drawings, wherein like and related numerals designate like and related parts throughout the several views, and first to FIGURES 1 through 5, the numeral 10 designates an automobile trunk compartment having a bottom wall 12, a back wall 14, and a side wall 16; and a lid 18 hinged at the front of the compartment.

Whenever it is desired to maintain the lid in an elevated open position and prevent it from bouncing, as when a package P, taller than the compartment is to be carried in the compartment, a prop in accordance with the present invention, and generally designated 20, is utilized.

The prop 20 comprises a U-shaped swivel bracket 22 having a cross member 24 and upstanding parallel legs 26, the cross member being provided with a centered hole 28 which rotatably receives the smooth round shank 30 of a swivel bolt 32. The bolt shank has an enlarged head 34, on its upper end, which bears upon the upper surface of the cross member 24, and a reduced diameter threaded stud 36, on its lower end, which receives a securing nut 38. A hole 40, of the same diameter as the hole 28, is formed in the compartment floor or bottom wall 12, through which the bolt shank 30 extends. A bearing washer 42 is engaged on the shank, between the bracket cross member 24 and the upper surface of the bottom wall 12, and another washer 44 is engaged on the shank between the nut 38 and the undersurface of the bottom wall. The bracket 22 is preferably mounted on the compartment bottom wall 12, adjacent to the back wall 14 of the compartment 10, adjacent to the left-hand side wall 16.

The prop 20 further comprises a standard which is composed of a tubular lower section 46, and a tubular upper section 48, slidably telescoped into the upper end of the lower section. The lower end of the lower section 46 is positioned between the legs 26 of the bracket 22, is spaced above the bolt head 34, and is centrally traversed by a headed pivot pin 50, which extends through the legs 26. This arrangement enables the standard to be swung to vertical operative position, from storage position, resting upon the compartment bottom wall 12, and return, and rotation, on the axis of the bolt 32, to extend lengthwise or crosswise of the compartment 10, in either erect or storage positions; and enables the standard to be stored, in an out-of-the-way position, along the compartment side wall 16, or along the back wall 14 thereof.

The upper standard section 48, preferably shorter than the lower section, has secured in and extending above its upper end, the shank 52 of an upstanding snap hook 54, the upper end of the lower section being crimped onto the snap hook shank 52, as indicated at 56, or this shank otherwise secured in place.

Opposed walls of the lower standard section 46 are formed with pluralities of vertically spaced adjustment holes 58, and the upper section 48 has single holes 60 in opposed walls thereof, through which a retaining means, such as a bolt 62, is adapted to be engaged, which is provided with a head 64 on one end and a wing nut 66 on its other end, for retaining the upper section 48 in a desired extended relationship to the lower section 46, for holding the lid 18 at a desired elevated open position.

The snap hook 54 is adapted to be securably engaged through an eye 68 which is secured to and extends downwardly from the lid 18, preferably in a position of vertical alignment with the bracket 22.

The prop 20 further comprises means for holding the same securely and releasably in storage position on the trunk compartment bottom wall 12, such as a U-shaped spring catch or slip 70, having a cross member 72, and upstanding spaced resilient legs 74. The legs 74 are formed with vertically spaced horizontal corrugations 76, which functionally grip opposed walls of the lower section 46, at a point near its upper end, as shown in FIGURES 2 and 4. The cross member 72 of the catch 70 is fastened to the compartment bottom wall 12, as by means of self-threading screws 78.

The prop shown in FIGURES 1 through 7 is composed of rectangular sections 46 and 48, while that shown in FIGURE 8 is composed of cylindrical sections 46a and 48a, the props being otherwise similar in construction.

FIGURES 6 and 7 show alternate forms of adjustment retaining means for the sections of the props, the bolt 62 of FIGURES 1 to 5 being replaced, in FIGURE 6, by a V-shaped spring 62a, having an uncrimped leg 80 opposed to a leg 82 formed with longitudinally spaced crimps 84, which are adapted to retainably engage the inner surface of the inner or upper standard sections, upon insertion of the spring; and, in FIGURE 7, being replaced by a U-shaped wire 62b, having a curved bight portion 86 and parallel spaced legs 88, and adapted to be passed endwise through the holes of the sections, so as to put the legs 88 retainably against the opposed outer sides of the outer or lower standard section.

It will be understood that, while the above described device has been illustrated and described as a prop for a trunk compartment lid, the device is readily susceptible of other adaptations, such as a prop for engine compartment hoods.

Although there have been shown and described preferred forms of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a compartment having a bottom wall, sidewalls, and end walls, and a lid for the compartment hinged adjacent one of said end walls, an eye depending from said lid, a prop for the lid comprising a U-shaped bracket having a cross member and upstanding legs, a swivel bolt journaled through said cross member and secured to the bottom wall of the compartment, a standard having the lower end positioned between said legs and pivoted thereto, a snap hook fixed on the upper end of said standard and adapted to be releasably secured to the eye on said lid when the lid is in the elevated position, said standard comprising slidably telescoped tubular lower and upper sections, one of said sections being pivoted to said bracket and the other section extending above said one section, and means for retaining the sections in collapsed and extended relationships, said retaining means comprising a plurality of longitudinally spaced holes in one of said sections, the other section having a single hole with which the plural holes are adapted to be selectively registered, and a retaining member extending securably and removably through registered holes, said retaining member comprising a bolt.

2. In combination, a compartment having a bottom wall, sidewalls and end walls, and a lid for the compartment hinged adjacent one of said end walls, an eye depending from said lid, a prop for the lid comprising a U-shaped bracket having a cross member and upstanding legs, a swivel bolt journeld through said cross member and secured to the bottom wall of the compartment, a standard having the lower end positioned between said legs and pivoted thereto, a snap hook fixed on the upper end of said standard and adapted to be releasably secured to the eye on said lid when the lid is in the elevated position, said standard comprising slidably telescoped tubular lower and upper sections, one of said sections being pivoted to said bracket and the other section extending above said one section, and means for retaining the sections in collapsed and extended relationships, said retaining means comprising a plurality of longitudinally spaced holes in one of said sections, the other section having a single hole with which the plural holes are adapted to be selectively registered, and a retaining member extending securably and removably through registered holes, said retaining member comprising a V-shaped spring having a straight leg and a leg formed with longitudinally spaced crimps adapted to securably engage one of the sections.

3. In combination, a compartment having a bottom wall, sidewalls and end walls, and a lid for the compartment hinged adjacent one of said end walls, an eye depending from said lid, a prop for the lid comprising a U-shaped bracket having a cross member and upstanding legs, a swivel bolt journaled through said cross member and secured to the bottom wall of the compartment, a standard having the lower end positioned between said legs and pivoted thereto, a snap hook fixed on the upper end of said standard and adapted to be releasably secured to the eye on said lid when the lid is in the elevated position, said standard comprising slidably telescoped tubular lower and upper sections, one of said sections being pivoted to said bracket and the other section extending above said one section, and means for retaining the sections in collapsed and extended relationships, said retaining means comprising a plurality of longitudinally spaced holes in one of said sections, the other section having a single hole with which the plural holes are adapted to be selectively registered, and a retaining member extending securably and removably through registered holes, said retaining member comprising a U-shaped spring wire having a curved bight portion and parallel spaced legs, the spring wire being adapted to be passed endwise through registered holes to put the legs at opposed sides of a section.

4. In combination, a compartment having a bottom wall, sidewalls and end walls, and a lid for the compartment hinged adjacent one of said end walls, an eye depending from said lid, a prop for the lid comprising a U-shaped bracket having a cross member and upstanding legs, a swivel bolt journaled through said cross member and secured to the bottom wall of the compartment, a standard having the lower end positioned between said legs and pivoted thereto, a snap hook fixed on the upper end of said standard and adapted to be releasably secured to the eye on said lid when the lid is in the elevated position, said standard comprising slidably telescoped tubular lower and upper sections, one of said sections being pivoted to said bracket and the other section extending above said one section, and means for retaining the sections in collapsed and extended relationships, said retaining means comprising a plurality of longitudinally spaced holes in one of said sections, the other section having a single hole with which the plural holes are adapted to be selectively registered, and a retaining member extending securably and removably through registered holes, and means for holding the standard along said support in a storage position, comprising a U-shaped spring clip adapted to be mounted to the support in which the standard is releasably engageable.

References Cited in the file of this patent

UNITED STATES PATENTS

| | | |
|---|---|---|
| 768,869 | Symons | Aug. 30, 1904 |
| 1,495,509 | Clark | May 27, 1924 |
| 1,598,868 | Lundelius | Sept. 7, 1926 |
| 2,256,588 | Beaman | Sept. 23, 1941 |
| 2,288,925 | Simpson | July 4, 1942 |
| 2,560,860 | Hannegan | July 17, 1951 |
| 2,663,585 | Tye | Dec. 22, 1953 |
| 2,912,268 | Markovich | Nov. 10, 1959 |
| 3,087,052 | Torgerson | Apr. 23, 1963 |